(12) United States Patent
Huang (10) Patent No.: US 7,991,533 B2
(45) Date of Patent: Aug. 2, 2011

(54) ADAPTIVE REDUCTANT DOSING AND EMISSION CONTROL STRATEGIES

(75) Inventor: Yiqun Huang, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1023 days.

(21) Appl. No.: 11/761,205

(22) Filed: Jun. 11, 2007

(65) Prior Publication Data

US 2008/0306631 A1      Dec. 11, 2008

(51) Int. Cl.
*F01N 3/20*          (2006.01)

(52) U.S. Cl. ............ 701/101; 701/102; 60/276; 60/295; 73/114.69; 73/114.75; 73/114.77

(58) Field of Classification Search .................. 701/101, 701/102; 60/276, 295; 73/114.69, 114.75, 73/114.77
See application file for complete search history.

(56) References Cited

U.S. PATENT DOCUMENTS

| | | | |
|---|---|---|---|
| 5,628,186 A | 5/1997 | Schmeiz | |
| 6,141,610 A | 10/2000 | Rothert et al. | |
| 6,363,771 B1 * | 4/2002 | Liang et al. | 73/23.31 |
| 7,181,337 B2 | 2/2007 | Kosaka | |
| 2006/0184307 A1 * | 8/2006 | Kosaka | 701/110 |
| 2006/0266022 A1 | 11/2006 | Woerner et al. | |
| 2007/0079597 A1 | 4/2007 | Wang et al. | |
| 2007/0079601 A1 | 4/2007 | Hirata et al. | |
| 2007/0113544 A1 | 5/2007 | Nishina et al. | |

FOREIGN PATENT DOCUMENTS

| | | |
|---|---|---|
| JP | 2006-226171 | 8/2006 |
| JP | 2007255367 | 10/2007 |

OTHER PUBLICATIONS

European Search Report dated Oct. 8, 2008 in related European Patent Application No. 08158025.0-2311.
"Selective Catalytic Reduction (SCR) Technology for the Control of Nitrogen Oxide Emissions from Coal-Fired Boilers. An Update of Topical Report No. 9," Clean Coal Technology, May 2005, (26 pgs.), Topical Report No. 23, NETL/US DOE/CCT Projects (www.netl.doe.gov/cctc).
"The ABC's of Exhaust Gas Recirculation (EGR)," Detroit Diesel, 2003, pp. 1-10, Detroit Diesel Corporation, Detroit, Michigan (12 pgs.) (www.detroitdiesel.com).
"Engineering Clean Air: The Continuous Improvement of Diesel Engine Emission Performance," Diesel Technology Forum, Mar. 2001, pp. 1-14, Herndon, Virginia (15 pgs.) (www.dieselforum.org).
van Helden, R., et al., "Engine Dynamometer and Vehicle Performance of a Urea SCR-System for Heavy Duty Truck Engines," Society of Automotive Engineers, Inc., 2002, (9 pgs.), #2002-01-0286.
European Office Communication dated Jul. 27, 2010 issued in related European Patent Application No. 08158025.0-2321.

* cited by examiner

Primary Examiner — Brian R Gordon
Assistant Examiner — Shogo Sasaki
(74) Attorney, Agent, or Firm — Grossman, Tucker et al.

(57) ABSTRACT

The present disclosure relates to a method or apparatus for controlling reductant dosing level introduced to a selective catalytic reduction device. The method or apparatus may determine available reductant and determine a distance to a source of reductant. This may be followed by adjusting a reductant dosing level based upon the available reductant and the distance to the reductant source. The apparatus may be installed in a vehicle and may also regulate in-cylinder emission control variables to reduce NOx emissions.

6 Claims, 8 Drawing Sheets

ADAPTIVE REDUCTANT DOSING AND EMISSION CONTROL STRATEGIES

FIELD OF THE INVENTION

The present disclosure relates to an apparatus and method for improving the performance of an exhaust treatment device such as a selective catalytic reduction (SCR) system. More particularly, the disclosure relates to adaptive reductant dosing and emission control strategies which may be used in diesel engines. The process may therefore rely upon monitoring of in-tank reductant levels and consideration of variables that may include distance to a reductant refill station, monitoring of reductant consumption level and adjusting reductant dosing to control tailpipe (NOx) emissions which may be combined with in-cylinder emission control methods to satisfy emission standards.

BACKGROUND

Internal combustion engines such as those found in cars and trucks may produce combustion byproducts and/or products of incomplete combustion which may be in the engine exhaust and emitted into the environment. Pursuant to emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides ($NO_x$). Accordingly, diesel engines may include a reductant-based selective catalytic reduction (SCR) device in order to seek reduction in nitrogen oxide concentrations. In addition, diesel engines may also include diesel particulate filters (DPF) for particulate matter (PM) control. Improving the performance of such systems remains an ongoing area of research and development.

SUMMARY

An aspect of the present disclosure relates to a controller amounting to a control unit capable of controlling a reductant dosing level introduced to a selective catalytic reduction catalyst wherein the control unit is capable of determining available reductant and a distance to a source of reductant. The control unit may then adjust a reductant dosing level based upon the available reductant and the distance to a source of reductant. The control unit may be installed in a vehicle and may also regulate in-cylinder emission control variables to reduce NOx emissions.

Another aspect of the disclosure relates to a method of controlling the reductant dosing level introduced to a SCR device. The method may include determining available reductant and determining a distance to a source of reductant. This may then be followed by adjusting a reductant dosing level based upon the available reductant and the distance to a source of reductant.

Another aspect of the present disclosure relates to an article comprising a storage medium having stored thereon instruction that when executed by a machine result in the following operations: determining available reductant and determining a distance to a source of reductant. This may then be followed by adjusting a reductant dosing level based upon the available reductant and the distance to a source of reductant.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Although the following detailed description will proceed with reference being made to illustrative embodiments, many alternatives, modifications, and variations thereof will be apparent to those skilled in the art.

DETAILED DESCRIPTION

As alluded to above, selective catalytic reduction (SCR) may be understood as a process where a reductant may be added to a combustion engine exhaust stream and interact with a catalyst. A reductant herein may therefore be understood as any compound (e.g. ammonia) or precursor compound (e.g. urea) that may be relied upon to assist a catalyst to reduce output levels of NOx from a combustion process. More specifically, a reductant such as ammonia may therefore react with the NOx in the exhaust gas to form water and nitrogen. In the case of urea ($CO(NH_2)_2$), which is one example of a precursor compound, it may react with water ($H_2O$) in the presence of a hydrolysis catalyst to yield carbon dioxide ($CO_2$) and ammonia ($NH_3$). The ammonia in turn may act as more fully described below. The selection of urea as an exemplary precursor to provide ammonia and react with NOx in the presence of a catalyst may therefore be illustrated as follows:

$$CO(NH_2)_2 + H_2O \rightarrow CO_2 + 2NH_3$$

$$2NH_3 + NO + NO_2 \rightarrow 2N_2 + 3H_2O$$

$$4NH_3 + 4NO + O_2 \rightarrow 4H_2 + 6H_2O$$

Figure 1:
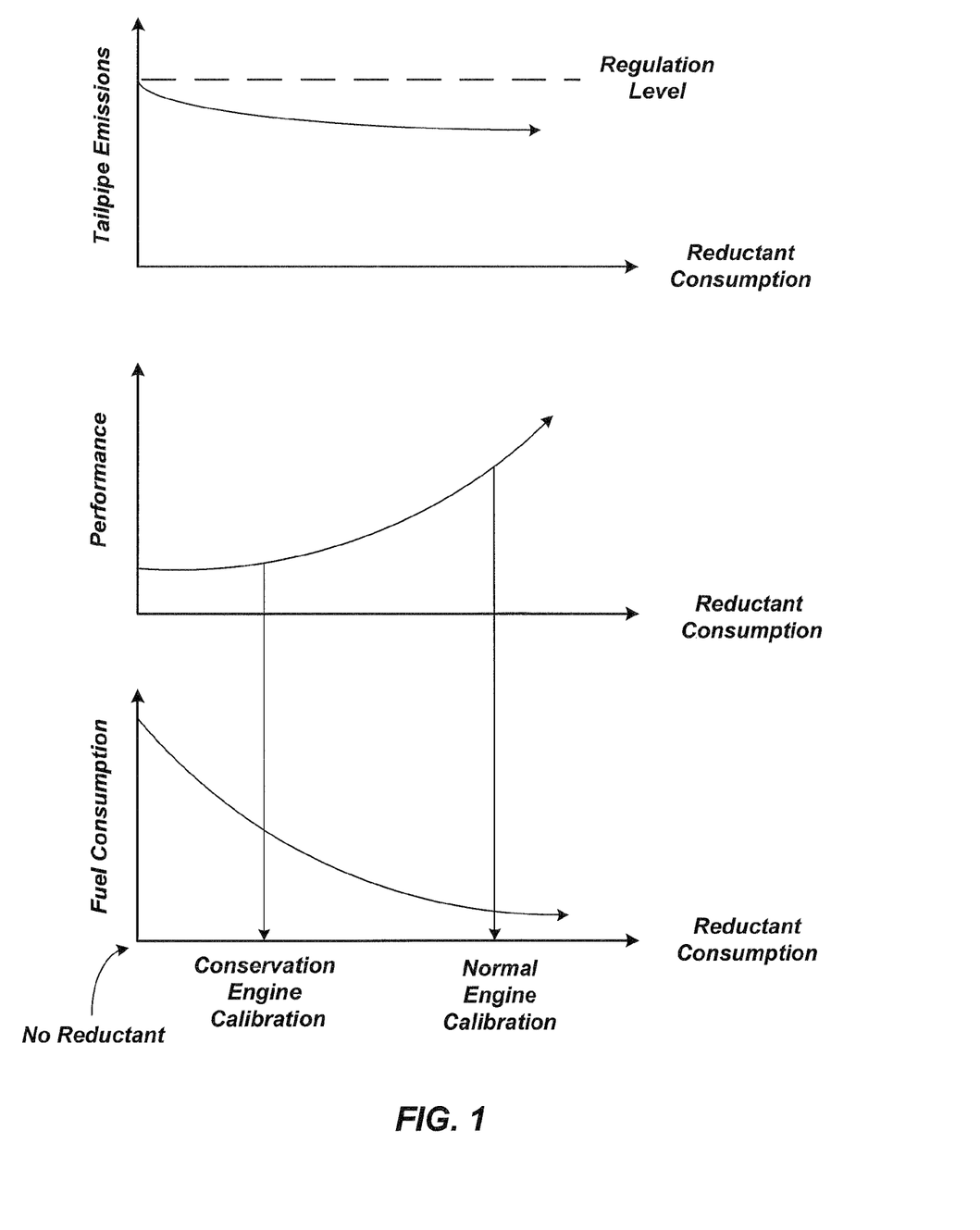
FIG. 1 illustrates the relationship between reductant consumption and vehicle fuel consumption, performance and emissions.

Attention is therefore directed to FIG. 1 which illustrates the relationship between reductant consumption and vehicle fuel consumption, performance and emissions. As may now be appreciated, when the engine is configured for higher fuel economy and relative strong performance, combustion may be optimized and the engine may employ what may be understood as normal engine calibration. However, NOx emissions may then be relatively high which may then require relatively higher reductant consumption in such normal protocol for SCR to convert NOx to $NO_2$. Under conservation engine calibration, and although there may be relatively less efficient combustion and lower fuel economy, reductant may be conserved while maintaining emissions below desired target levels. It may therefore be understood herein that normal engine calibration may consume relatively higher dosage levels of reductant than in conservation engine calibration which may use relative lower dosage levels.

As may also be appreciated, under those circumstances where there may be no precursor such as urea, engine in-cylinder emission control approaches may then be required to maintain emission levels. This may include retarded injection timing (i.e. a delay in the start of fuel injection to reduce combustion temperature), low pressure loop exhaust gas recycling (EGR) and/or high pressure loop EGR (which may lower maximum combustion temperature), lower compression ratios, lower temperature combustion, and/or premixed controlled combustion in order to maintain target emission standards. It may also include control of fuel mass, boost pressure, air flow (amount and temperature) and variable valve actuation timing of the intake/exhaust valves and lift. In addition, with respect to EGR, it may include control of the amount and temperature of such exhaust gas recycling. However, under these circumstances, where the SCR NOx catalyst is not employed, fuel economy and performance may be significantly compromised and may create excess particulate (e.g. soot). It may therefore be appreciated that the availability of reductant may be an important variable in connection with optimizing exhaust treatment.

Figure 2:
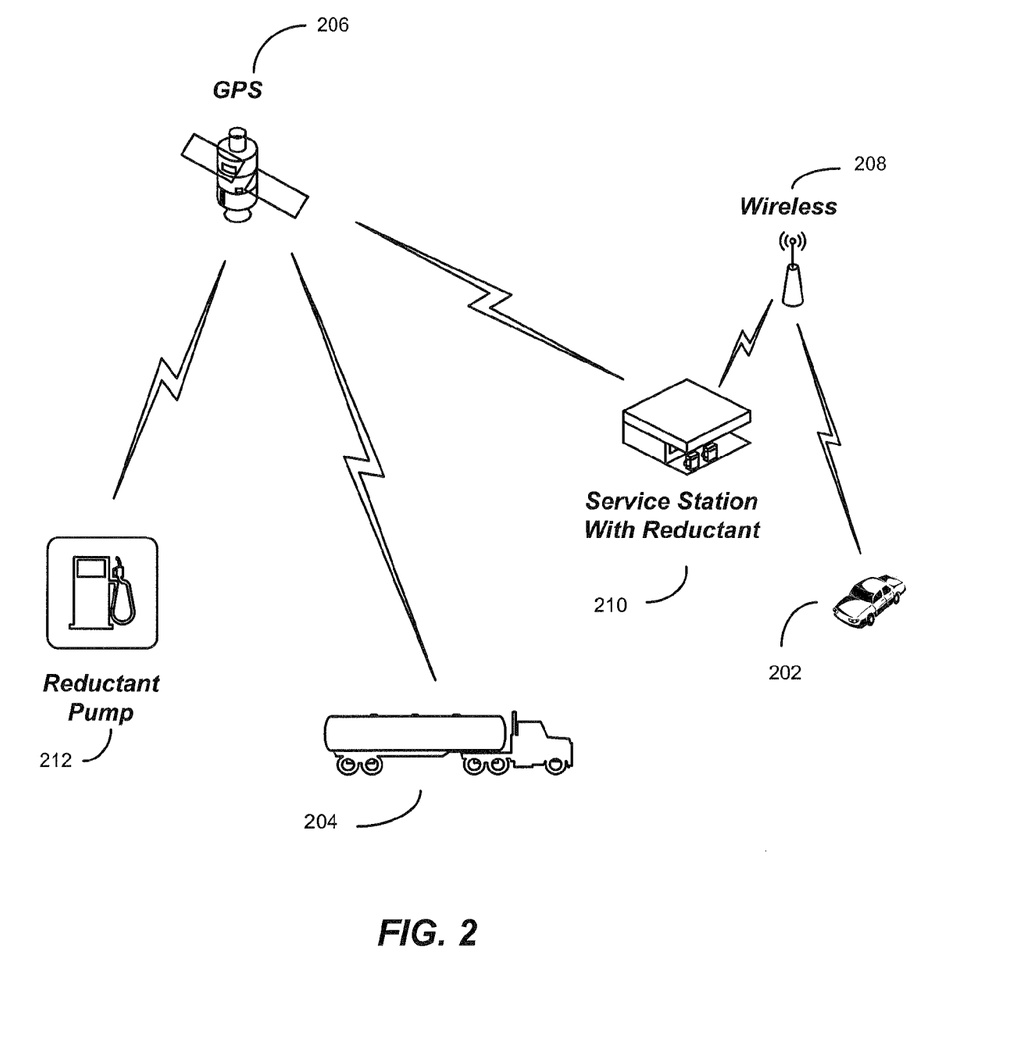
FIG. 2 illustrates an exemplary wireless communication network as between relatively light and heavy-duty vehicles and a reductant service station which system may monitor distance to reductant fill-up and availability of reductant for a given vehicle.

Attention is therefore directed to FIG. 2 which provides an illustration of an exemplary reductant distribution information system now contemplated by the present disclosure. As may be appreciated, relatively light or heavy duty vehicles 202 and 204 may communicate via GPS 206 or by other wireless systems 208 to determine the location of service stations 210 or other fueling stations 212 where reductant may be distributed. The distribution system herein may therefore generate information corresponding to, e.g. the distance between the vehicle and a source for reductant such as an available reductant fill-station. An available reductant fill station may be understood as a fill station confirming the availability of reductant through a communication network (e.g. wireless network) for use by a vehicle.

Figure 3A:
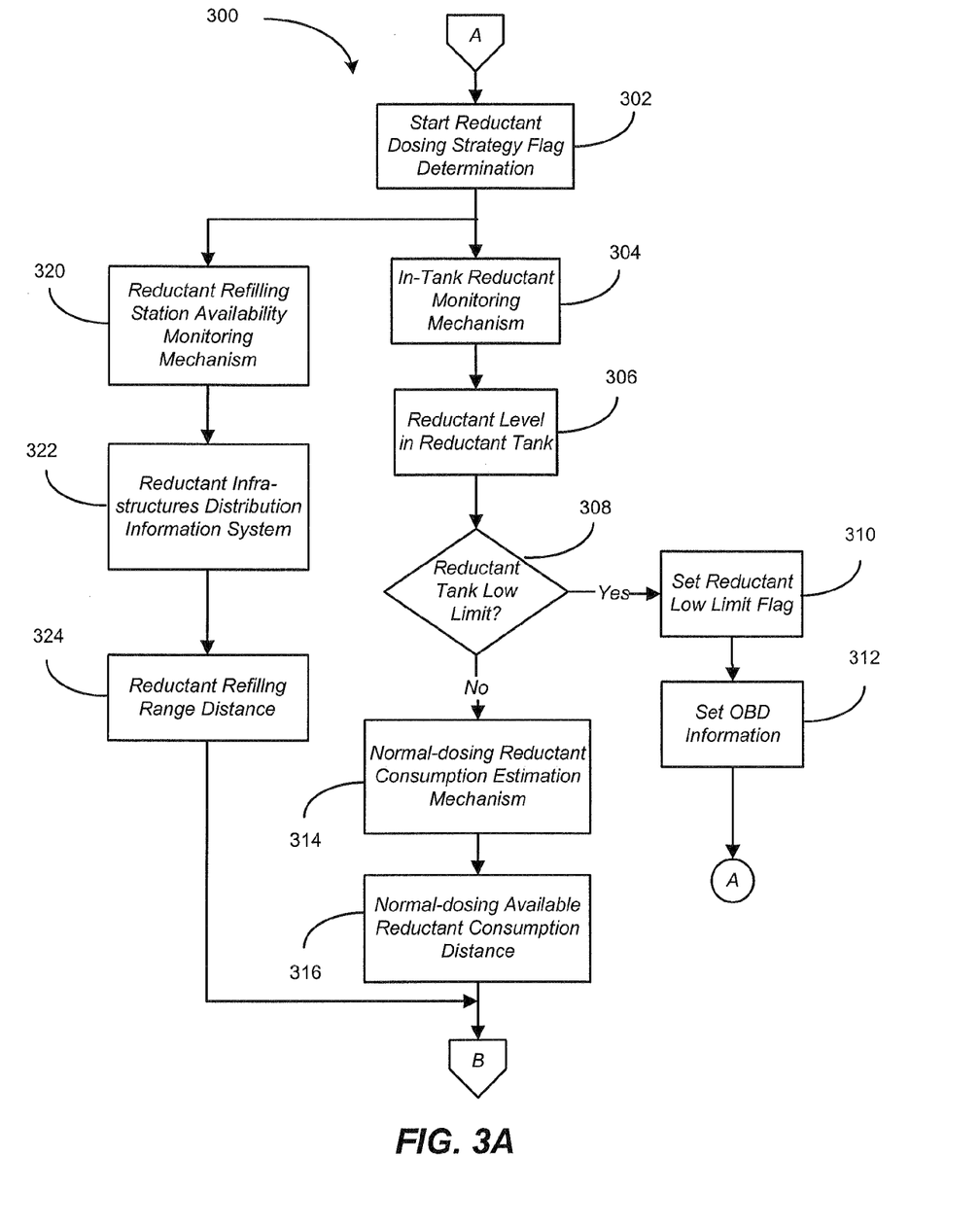
FIGS. 3A and 3B provides a flow-chart illustrating the determination of a reductant dosing mode.
Figure 3B:
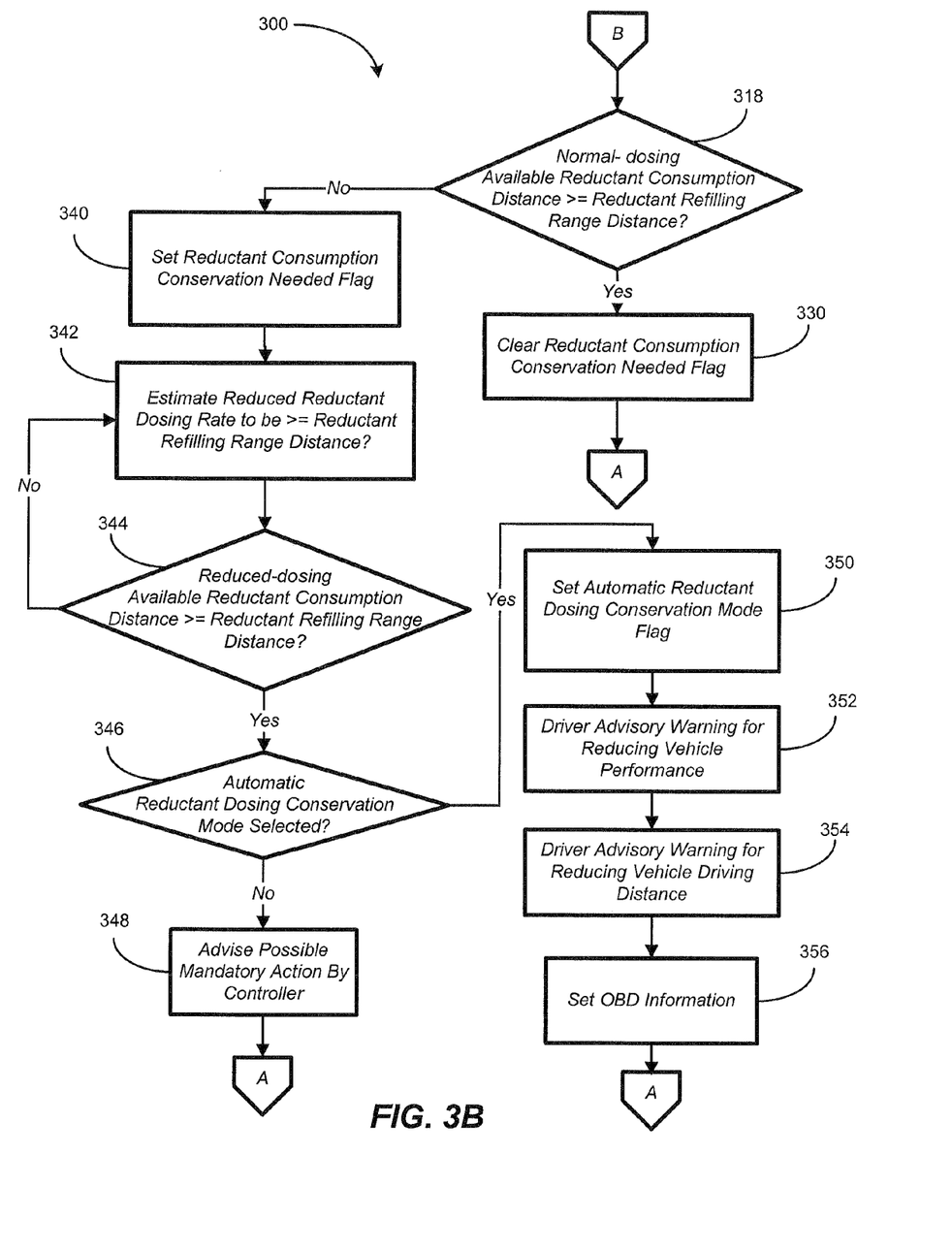

Attention is next directed to FIGS. 3A-3B which illustrate in scheme 300 how one may intermittently determine a particular reductant dosing mode for engine consumption. Accordingly, at 302 one may start the reductant dosing strategy to initially determine whether a flag should be set indicative of whether or not the reductant in a given vehicle may be above or below some preset limit. At 304 an in-tank monitoring sensor may be triggered for reductant level in a reductant tank 306 and a determination (see below) may be made regarding the reductant level in a given tank. Such determination may be accomplished by, e.g., a fluid level sensor, pressure sensor and/or an optical sensor in communication with the reductant tank.

Accordingly, at 308, a determination may be made as to whether or not the reductant is at a given lower limit. Such lower limit may be preprogrammed into the system or be set by the driver. If "yes" at 308 a flag or other indicator may be set at 310 to signify that the reductant is at or below the selected lower limit. At 312 the on-board diagnostics may be informed that the reductant lower limit flag has been set. If "no" at 308 the system may estimate reductant consumption at 314 at normal reductant dosage levels which may depend upon current driving conditions. This may include average speed, average fuel consumption, etc. Again, as noted above, a normal reductant dosage level or consumption may be understood as a dosage level (e.g. grams/unit of time) that may be provided to reduce the relatively high NOx levels during normal engine calibration. Accordingly at 316, the estimated distance the vehicle may travel employing the normal dosage of reductant may be determined. Furthermore, a determination may then be made at 318 as to whether or not normal dosing of reductant may be continued based upon the normal reductant dosing and the distance to a reductant refill station.

As noted above, at the time that the above referenced reductant dosing strategy is implemented, the system may initiate at 320 a monitoring protocol to determine reductant refill station availability. The system at 322 may therefore communicate with the reductant distribution information system (FIG. 2) which may then allow the system to determine at 324 the distance to a reductant refill station. For example, GPS or wireless information may be assessed to determine the driving distance to a reductant refill station.

Accordingly, at 318, if the system determines that reductant is available under normal dosing conditions through the distance to a reductant refill station, (i.e., that there will be sufficient reductant in the tank to adequately process NOx at some regulatory level over a given distance) the system at 330 may clear any conservation reductant flag (explained below) that may have been previously set. If at 318 the system determines that the normal reductant dosing is not available for the given distance (i.e., that the vehicle will run out of reductant,) the system may set a conservation reductant flag at 340. Then, the system at 342 may estimate and select a reduced reductant dosing rate. At 344, the distance for which the reduced dosing rate is available, prior to running out of reductant, may be compared to the distance to a reductant refilling station. If the estimated reduced reductant dosage determined at 342 is too high and the vehicle may run too low or even out of reductant prior to completing the distance to a refilling station at 344, a new reduced reductant dosing rate may be determined at 342. It may therefore be appreciated that conservation reductant dosage herein contemplates a reductant dosage that is less than the above described normal reductant dosing.

If the estimated reduced reductant dosing rate provides a sufficient distance to a refilling station at 344, then at 346 a determination may be made as to whether the driver has selected or activated an automatic reduced reductant conservation mode. If automatic reductant conservation mode has not been selected at 346, then at 348 the driver may be advised of possible mandatory action. If automatic reductant conservation mode has been selected at 346 then at 350 the automatic reductant conservation flag may be set. At 352 a driver advisory may be issued warning the driver that the vehicle performance may be reduced or at 354 a driver advisory may be issued warning the driver that the vehicle driving distance may need to be reduced due to reduced fuel economy or performance. A signal may also be sent to the on-board diagnostics at 356 notifying the on-board diagnostics that the automatic conservation flag is set.

Figure 4:
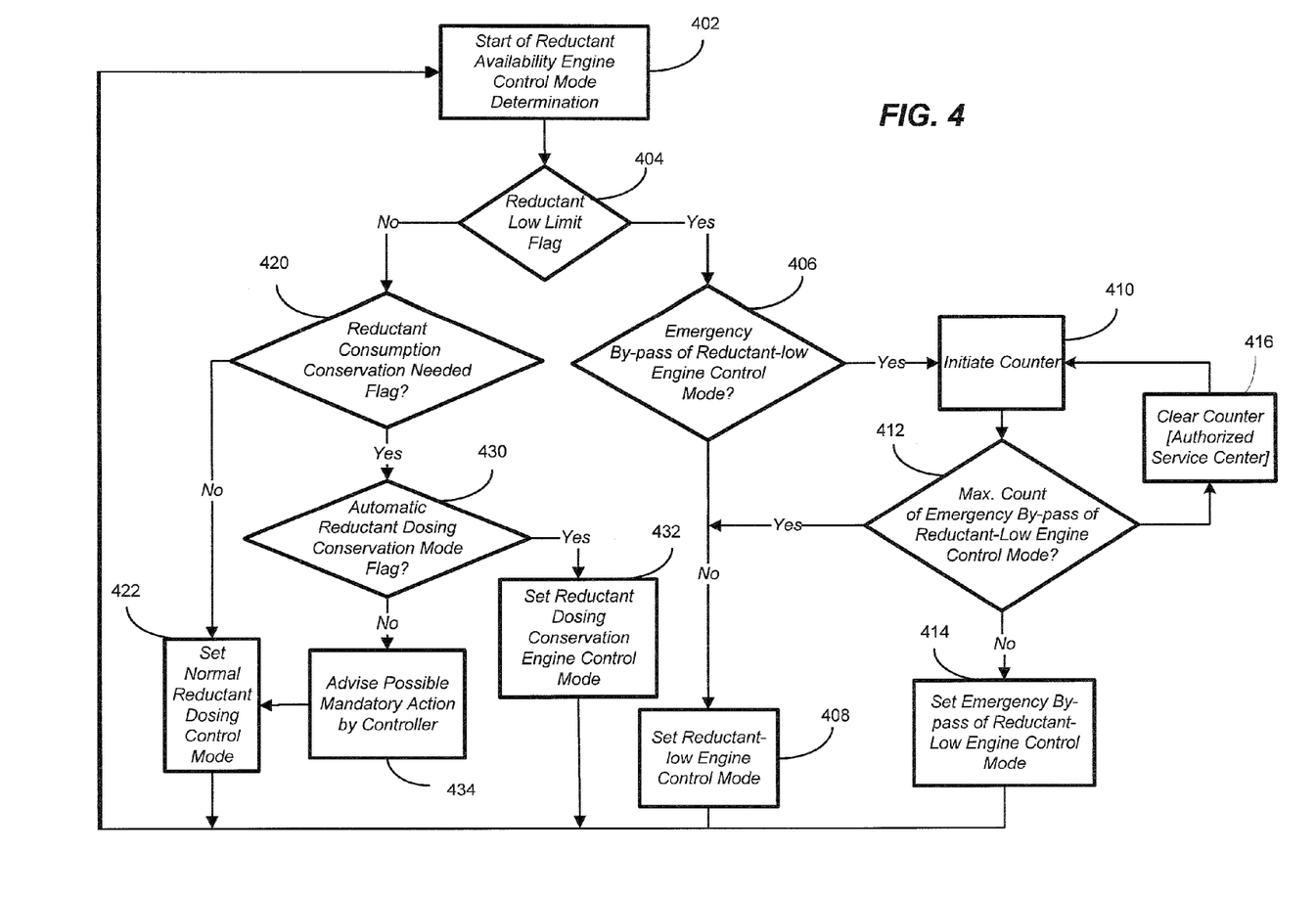
FIG. 4 illustrates selection of a corresponding engine control mode according to the reductant dosage mode as illustrated in FIG. 3.

Attention is next directed to FIG. 4 which illustrates how, after a reductant dosing mode is selected (FIG. 3) a corresponding engine control mode may be implemented. Specifically, at 402 one may start to determine the selection of engine calibration based upon the dosing mode determination and at 404 a determination may be made as to whether or not the reductant low limit flag has been set. If yes, a determination may be made as to whether or not an emergency by-pass of the "reductant-low engine control mode" may have been manually set. If the emergency by-pass was not set at 406 then at 408 the reductant low engine control mode may be implemented. If the emergency by-pass was set at 406 then a counter may be initiated at 410. Such counter may keep track of the number of times emergency by-pass mode has been entered into. At 412 a determination may be made as to whether or not the number of times emergency by-pass mode has been exceeded. If the counter has been exceeded, the reductant low engine control mode may again be implemented at 408. If the counter has not been exceeded at 412, then at 414 the emergency by-pass of the reductant low engine control mode may be set. At 416 the counter may be cleared by an authorized service center.

If the reductant low limit flag has not been set at 404, then at 420 a determination may be made as to whether or not the reduction conservation flag has been set. If such flag has not been set then the normal reductant dose and control mode may be implemented at 422. If such flag has been set a determination may be made at 430 as to whether or not the automatic reductant dosing flag has been set. If yes, at 432, the reductant dosing conservation engine control mode may be implemented. If not, at 434, the driver may be advised of possible mandatory action necessary in view of the available reductant.

It may therefore be appreciated in FIG. 4 that tailpipe emissions and NOx concentration may be relatively low when the normal reductant dosing control mode is selected. Similarly, the relative level of NOx emissions may be low when the reductant dosing conservation mode is set, or when the reductant low engine control mode is set. However, relatively higher NOx emissions may be observed when the emergency by-pass engine control mode is selected.

Figure 5:
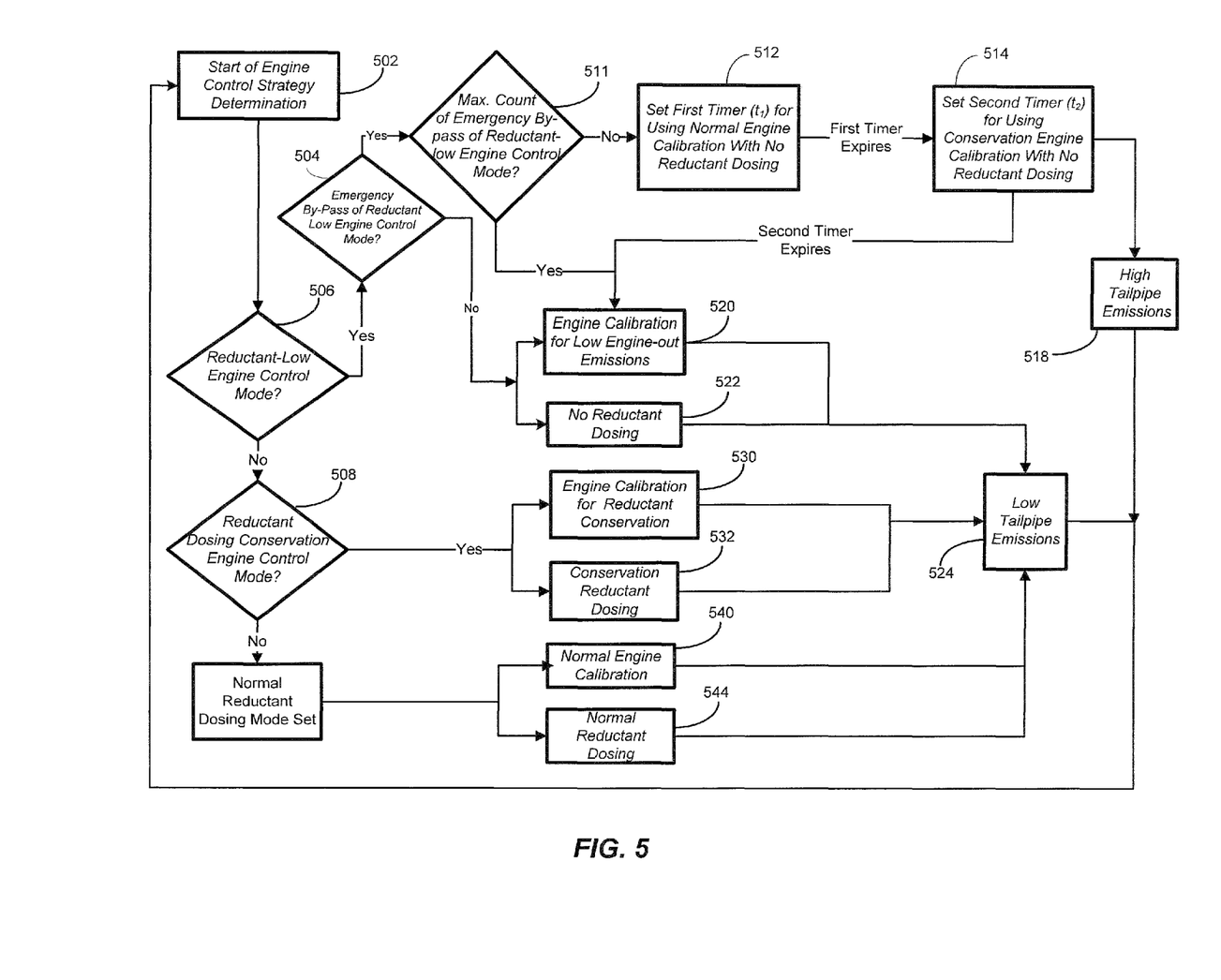
FIG. 5 illustrates selection of an engine control mode (FIG. 4) and a reductant dosing mode (FIGS. 3A and 3B).

FIG. 5 illustrates selection of an engine control mode (FIG. 4) and a reductant dosing mode (FIGS. 3A and 3B). At 502 the system may start consideration of an overall engine control strategy determination. At 506 the system may determine if reductant low-engine control mode has been selected. Such selection may have been made, e.g., at step 408 in FIG. 4. The system may then consider at 504 whether the emergency by-pass of reductant low engine control mode has been selected (see e.g., step 414 in FIG. 4). If the mode was selected at 504 and the maximum number of times emergency by-pass mode may be entered has not been exceeded at 511 (as determined by referencing a counter) then at 512 a first timer ($t_1$) may be set for using normal engine calibration without reductant dosing. If $t_1$ expires a second timer may be set ($t_2$) at 514 for conservation engine calibration without reductant. If $t_2$ expires the system goes to 520 which is the engine calibration for low-engine out emissions and no reductant dosing 522. It may be appreciated that during either $t_1$ or $t_2$ there may be relatively high tailpipe emissions as shown at 518. In such a manner, i.e., operating the engine under low engine-out emission calibration at 520, the engine may then reduce tailpipe emissions, such that relatively low tailpipe emissions may be produced at 524. Such engine calibrations may include, as noted above, retarded injection timing (i.e. a delay in the start of fuel injection to reduce combustion temperature), low pressure loop exhaust gas recycling (EGR) and or high pressure loop EGR (which may lower maximum combustion temperature), lower compression ratios, lower temperature combustion, and/or premixed controlled combustion. It may also include control of fuel mass, boost pressure, air flow (amount and temperature), variable valve actuation timing and lift, and control of the amount and temperature of recycled exhaust gas.

If reductant-low engine control mode is not selected at 506 then a determination may be made as to whether reductant dosing conservation engine control mode has been selected at 508. Such selection may have been made, for example, at step 432 in FIG. 4. If reductant doing conservation engine control mode has been selected at 508, then the engine may be operated under the calibration to provide reductant conservation at 530 and reductant dosing may be set for conservation at 532 which may produce relatively low tailpipe emissions at 524.

If reductant dosing conservation engine control mode has not been selected at 508 then at 510 normal reductant dosing mode may be set. Such selection may have been previously made at 422 of FIG. 4. Accordingly, in such mode, normal engine calibration may be implemented at 540 and normal reductant dosing may be provided at 542 producing relatively low tailpipe emissions at 524.

Figure 6:
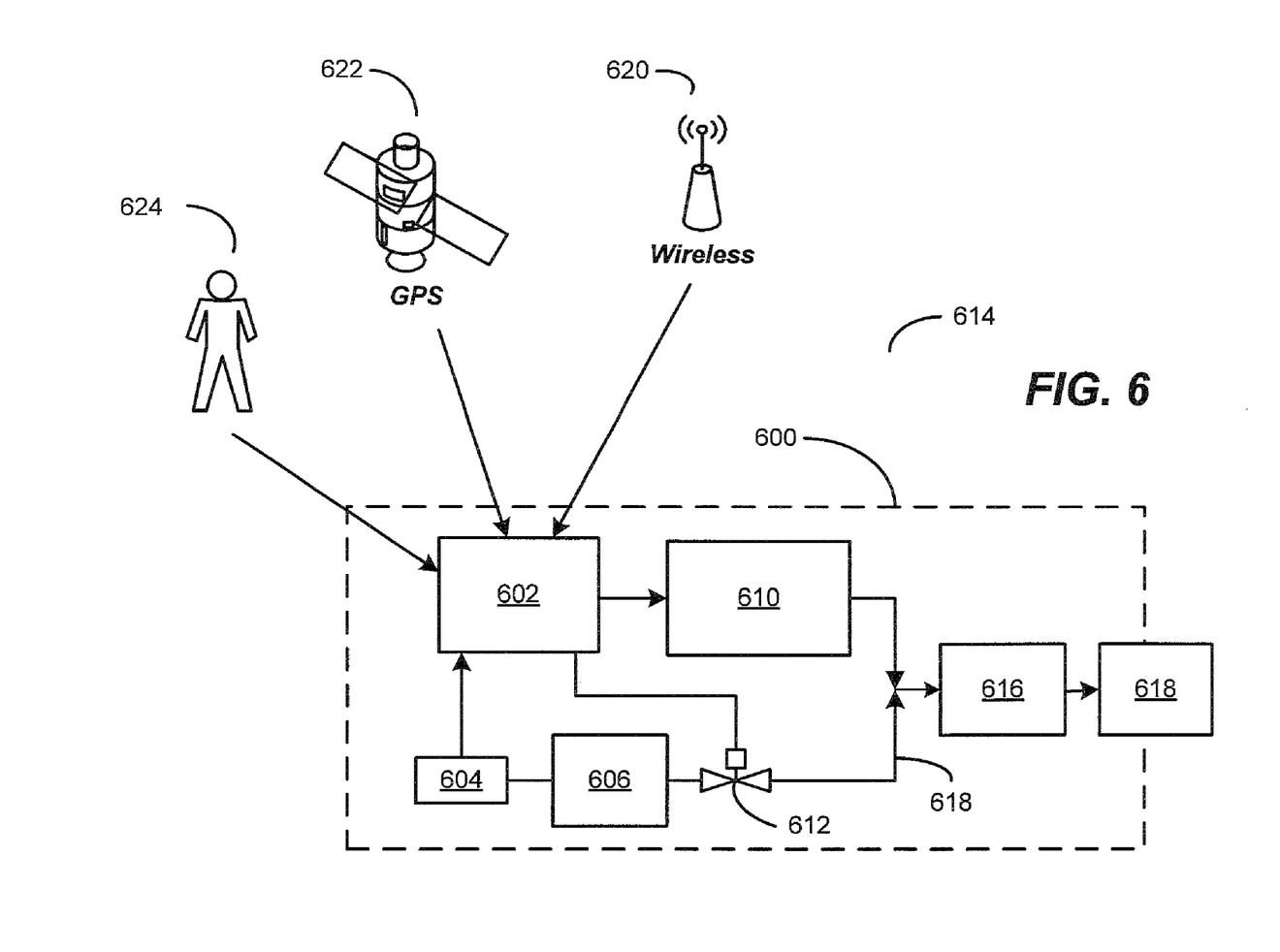
FIG. 6 illustrates an exemplary overview of the exemplary vehicle control system disclosed herein.

FIG. 6 illustrates an exemplary overview of the vehicle control system for implementing the above control scheme. A vehicle 600 may include a controller 602 wherein the controller 602 may receive data from wireless communications 620, GPS 622 as well as driver input 624. The engine controller may also received data from a sensor 604 in communication with a reductant tank 606, indicating the level of reductant in the tank. The controller may assess information obtained from the various inputs, such as the driving distance to a reductant refilling station and/or level of reductant in the tank which may be supplied from the GPS 622 and/or wireless tower 620 and/or from manual input. The controller may therefore communicate with the engine 610 and a reductant dosing valve 612. Exhaust 614 from the engine may be directed to a SCR 616. Reductant 618 may be added to the exhaust 614, once the exhaust enters the SCR or just prior to entering the SCR. Once the exhaust is treated with the reductant, as described above, the treated exhaust may be emitted from the tailpipe 618. The controller may then implement any of the protocols outlined above in FIGS. 3-5 to control the engine 614 and dosing of the reductant 618 via the reductant dosing valve 612. The controller 602 may also amount to an after-market controller that may be employed in a given vehicle engine to improve performance of a given SCR system. Accordingly it is contemplated herein that the controller herein may provide the in-cylinder control noted above and/or coordinate with an existing vehicle engine in-cylinder control system.

Figure 7:
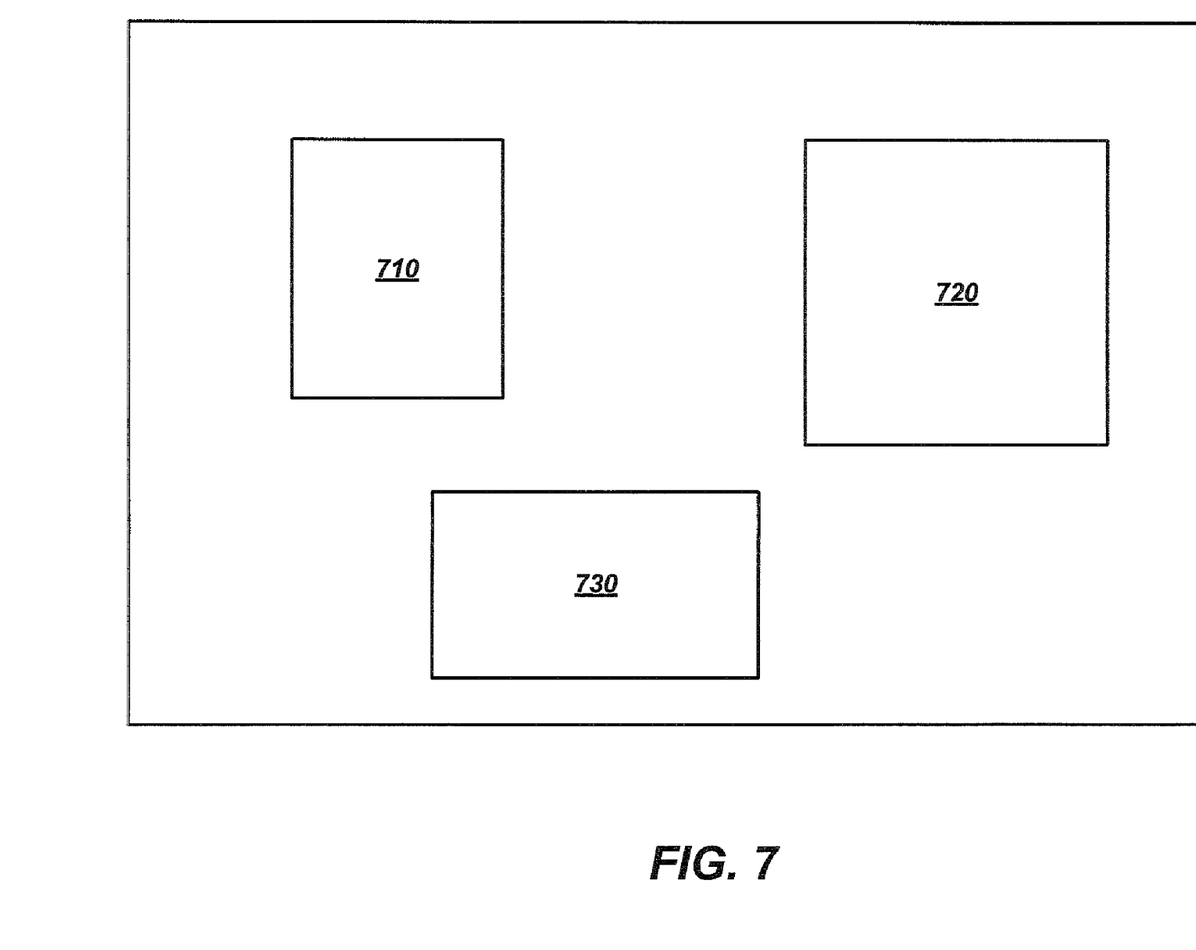
FIG. 7 illustrates the engine combustion controller herein as including a processor, machine readable media and a user interface.

It should also be appreciated that the functionality described herein for the embodiments of the present invention may be implemented by using hardware, software, or a combination of hardware and software, either within the engine combustion controller or outside the engine combustion controller, as desired. If implemented by software, a processor and a machine readable medium are required. The processor may be of any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format. Accordingly, in the broad context of the present invention, and with attention to FIG. 7, the engine combustion controller may contain a processor (710) and machine readable media (720) and user interface (730). Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of controlling reductant dosing level introduced to a selective catalytic reduction device implemented by a controller located within a vehicle, comprising:

determining available reductant, based on data received from a sensor in communication with a reductant tank;

determining a distance to a source of reductant, wherein said source of reductant includes a reductant refilling station, based on data received from one or more of the following: GPS, wireless towers and driver input;

determining if said available reductant is less than a predetermined level;

setting a reductant low limit flag and determining if a by-pass mode has been manually set if said available reductant is less than said predetermined level;

implementing said by-pass mode if said by-pass mode has been manually set, with zero reductant dosing, and counting the number of times said by-pass mode with zero reductant dosing has been previously implemented by said controller;

determining if the number of times previously in said by-pass mode exceeds a previously determined value; and if said number of times previously in said by-pass mode exceeds a previously determined value operating an engine in said vehicle under an engine calibration for low-engine out emissions.

2. The method of claim 1 further comprising:

adjusting one or more of the following engine parameters when operating said engine under said engine calibration for low-engine out emissions: fuel injection timing, amount or temperature of exhaust gas recycling, amount or temperature of air flow, fuel mass, compression ratio, variable valve actuation timing, boost pressure or combustion temperature.

3. The method of claim 1 further comprising:

initiating a timer for a given time period after said by-pass mode is implemented; and further adjusting one or more of the following engine parameters: injection timing, amount or temperature of exhaust gas recycling, amount or temperature of air flow, fuel mass, compression ratio, variable valve actuation timing, boost pressure or combustion temperature, during said given time period.

4. An article comprising a computer readable storage medium having stored thereon instruction that when executed by a controller included in a vehicle result in the following operations:

determining available reductant, based on data received from a sensor in communication with a reductant tank;

determining a distance to a source of reductant, wherein said source of reductant includes a reductant refilling station, based on data received from one or more of the following: GPS, wireless towers and driver input;

determining if said available reductant is less than a predetermined level;

setting a reductant low limit flag and determining if a by-pass mode has been manually set if said available reductant is less than said predetermined level;

implementing said by-pass mode if said by-pass mode has been manually set, with zero reductant dosing, and counting the number of times said by-pass mode with zero reductant dosing has been previously implemented by said controller;

determining if the number of times previously in said by-pass mode has exceeded a previously determined value; and if said number of times previously in said by-pass mode exceeds a previously determined value, operating an engine in said vehicle under an engine calibration for low-engine out emissions.

5. The article of claim 4, wherein said instructions that when executed by said controller result in the following additional operations:

adjusting one or more of the following engine parameters when operating said engine under said engine calibration for low-engine out emissions: fuel injection timing, amount or temperature of exhaust gas recycling, amount or temperature of air flow, fuel mass, compression ratio, variable valve actuation timing, boost pressure or combustion temperature.

6. The article of claim 4, wherein said instructions that when executed by said controller result in the following additional operations initiating a timer for a given time period after said by-pass mode is implemented; and further adjusting one or more of the following engine parameters: injection timing, amount or temperature of exhaust gas recycling, amount or temperature of air flow, fuel mass, compression ratio, variable valve actuation timing, boost pressure or combustion temperature, during said given time period.

* * * * *